Patented Oct. 14, 1924.

1,511,875

UNITED STATES PATENT OFFICE.

GRAHAM EDGAR, OF WASHINGTON, DISTRICT OF COLUMBIA, ASSIGNOR TO UNITED STATES OF AMERICA, AS REPRESENTED BY THE SECRETARY OF WAR.

METHOD OF TEMPERATURE CONTROL IN CHEMICAL REACTIONS.

No Drawing.     Application filed January 3, 1920. Serial No. 349,354.

*To all whom it may concern:*

Be it known that I, GRAHAM EDGAR, a citizen of the United States, residing at Washington, District of Columbia, have invented an Improvement in Methods of Temperature Control in Chemical Reactions, of which the following is a specification.

This invention relates to the promotion of chemical reactions for its objects the convenient and economical temperature control during reactions between solids and fluids, especially solids and concentrated acids.

Heretofore, one of the serious problems encountered in industrial chemical processes was that of the disposition of the reaction heat and the regulated control of the temperatures of the reacting mass, particularly in large scale operations.

In the case of reactions in which only liquid phases are concerned, various types of refrigerating devices are employed with reasonable success, and in the case of reactions in which only the gaseous phase occurs, heat interchangers are successfully employed, but in the case of reactions between solids and liquids, or between solids and gases, and in all cases where the products of reaction are solid or semi-solid, the disposal of the heat of reaction and the control of temperature are much more difficult.

My investigations have shown that proper temperature control may be effectively achieved in such reactions by causing at least one of the reacting substances to be suspended in finely divided condition in air or other gas at the time of reaction. Thus a finely divided suspension of a solid substance in an air current may be brought in contact with a fine mist of liquid and allowed to react; or a finely divided suspension of a solid substance in air or other gas may be passed directly into a body of liquid with which it will react; or, again, a finely divided suspension of a solid substance in air or other gas may be mixed with a gas with which it will react. In any case, it is possible to control the temperature of the reaction and dissipate the heat of reaction by regulating the concentration of the suspended substance in the gaseous medium, since large or small amount of heat will be given up to the gaseous medium, accordingly, as the concentration of the reacting suspended substance is high or low. In all cases the gaseous medium serves to absorb such part of the heat of reaction as may be desired by its own heat absorption capacity, and also in those cases in which liquid phases are involved, through causing some evaporation of the liquid to occur.

Various mechanism of well known types may be employed for carrying out my improved process, the same varying somewhat with the nature of the substance. Thus, for example, liquids may be formed into a fine mist by means of such nozzles as are used in commercial spraying devices, or by other means, and on the other hand finely divided suspensions of solids may be, for example, formed by introducing the finely ground solid into a current of air by utilizing such devices as is used in the carburetors of the well known powdered coal burners.

An example of a reaction in which the application of this principle may be found advantageous is that between calcium cyanamide and sulfuric acid. It has been often proposed that many of the objectionable qualities of calcium cyanamide may be overcome, and useful nitrogeneous fertilizers formed, by the treatment of the calcium cyanamide with sulfuric acid. However, the very large amount of heat accompanying the reaction has made the control of temperature so difficult that prior to my invention, satisfactory, practical and economical conditions of reaction with the consequent production of a satisfactory product, do not seem to have been achieved.

In carrying out my preferred procedure, I may proceed as follows:

Finely ground calcium cyanamide is suspended in an air current by any intake means, such, for example, as above indicated, and the mixture is then brought in contact with a fine mist or spray of sulfuric acid in the proportions in which it is desired that the substances should react. By this procedure, using given quantities of calcium cyanamide and sulfuric acid, the temperature of the reaction may be regulated at will by regulating the amount of air mixed with the calcium cyanamide and by regulating the fineness of the acid spray, thereby rendering it possible to maintain a temperature that is most suitable to obtain the particular reaction product desired.

For example, an effective yield of urea can be obtained by bringing together 2952 parts of sulphuric acid (figured on the basis of 100% acid) in the form of a 15 normal solution, i. e. 734 grs. per liter, with 2000 parts of cyanamid suspended in an air current. By employing the foregoing cooling means, the destructive decomposition of the cyanamid or the area formed therefrom will be prevented, provided the temperature is held below the boiling point, and preferably from 80° to 100° C.

The excess acid in the product obtained from the above described treatment of cyanamid and sulphuric acid can profitably be neutralized with finely ground phosphate rock in the proportion of about 1200 parts of 70% native phosphate rock (100 to 200 mesh) with every 2000 parts of cyanamid treated.

Not only do the air currents serve effectively to control the temperature, but they also serve, because of their tendency to entrain moisture, as dehydrating agents, with a consequence of the resulting product from the treatment of cyanamid will be reasonably granular and dry, i. e. non-pastry or not objectionably sticky and will upon exposure to the air rapidly dry out sufficiently to be packed for shipment without further treatment.

The objection to the employment of weak acid and reaction as the foregoing, is not only because of the fact that the introduction of unnecessary water requires the subsequent removal of the same, and unnecessarily expensive procedure, but also as in the case of production of urea from cyanamid, an effective yield of the desired product is not obtainable when employing dilute acid.

Having thus described my invention, what I claim and desire to secure by Letters Patent of the United States is:—

1. The process for controlling the temperature of the reaction between calcium cyanamid and sulfuric acid which consists in suspending one of such substances in a current of air and then causing them to contact with each other.

2. The process for controlling the temperature of the reaction between calcium cyanamid and sulfuric acid which consists in suspending calcium cyanamid in a current of air and then causing the same to react with liquid sulfuric acid brought into contact therewith.

3. The process for controlling the temperature of the reaction between calcium cyanamid and mineral acid which consists in suspending one of such substances in a current of air and then causing them to contact with each other.

4. The process for controlling the temperature of reaction between a calcium cyanamid and a mineral acid, which consists in suspending one of them in a finely divided condition in a gaseous medium, controlling the ratio of the suspended substance to the gaseous medium and then bringing the other substance into contact with the suspended substance.

5. The process for controlling the temperature of reaction between calcium cyanamid and a mineral acid, which consists in suspending the calcium cyanamid in a finely divided condition in a gaseous medium, controlling the ratio of the cyanamid to the gaseous medium, and then bringing it in contact with the mineral acid.

6. The process for controlling the temperature of reaction between calcium cyanamid and a mineral acid, which consists in suspending one of them in a gaseous medium and then bringing the other substance into contact with the suspended substance.

GRAHAM EDGAR.